United States Patent
Lihl et al.

(10) Patent No.: US 10,144,010 B2
(45) Date of Patent: Dec. 4, 2018

(54) MANIPULATION HOLDER FOR CRYOMICROSCOPY

(71) Applicants: Leica Mikrosysteme GmbH, Vienna (AT); European Molecular Biology Laboratory, Heidelberg (DE)

(72) Inventors: Reinhard Lihl, Vienna (AT); Leander Gaechter, Oberriet SG (CH); John Briggs, Heidelberg (DE); Martin Schorb, Ladenburg (DE)

(73) Assignees: Leica Mikrosysteme GmbH, Vienna (AT); European Molecular Biology Laboratory, Heidelberg (DE)

( * ) Notice: Subject to any disclaimer, the term of this patent is extended or adjusted under 35 U.S.C. 154(b) by 564 days.

(21) Appl. No.: 14/804,942

(22) Filed: Jul. 21, 2015

(65) Prior Publication Data
US 2016/0030941 A1  Feb. 4, 2016

(30) Foreign Application Priority Data
Jul. 29, 2014  (DE) ........................ 10 2014 110 724

(51) Int. Cl.
*B01L 9/00* (2006.01)
*B01L 7/00* (2006.01)

(52) U.S. Cl.
CPC .................. *B01L 9/00* (2013.01); *B01L 7/50* (2013.01); *B01L 9/50* (2013.01); *B01L 2200/025* (2013.01); *B01L 2200/087* (2013.01); *B01L 2200/185* (2013.01); *B01L 2300/041* (2013.01); *B01L 2300/0609* (2013.01)

(58) Field of Classification Search
CPC .. B01L 9/52; B01L 9/523; B01L 9/527; B01L 2300/0809; B01L 2300/0822; B01L 7/50; B01L 2200/025; B01L 2300/0609
USPC .................... 422/560, 561, 563, 565, 566
See application file for complete search history.

(56) References Cited

U.S. PATENT DOCUMENTS

| 5,533,342 A | 7/1996 | Gordon |
| 8,395,130 B2 | 3/2013 | Bächter |
| 2003/0198574 A1 | 10/2003 | Studer |

FOREIGN PATENT DOCUMENTS

| CN | 1662838 | 8/2005 |
| JP | S55107230 | 8/1980 |
| JP | S6423864 U | 2/1989 |
| JP | 2000215837 | 8/2000 |
| JP | 2002214091 | 7/2002 |
| JP | 2010054498 | 3/2010 |

OTHER PUBLICATIONS

Leica Microsystems, Leica EM VCT100 Vacuum Cryo Transfer (product brochure), May 2009, Vienna, Austria.

*Primary Examiner* — Jill A Warden
*Assistant Examiner* — Dwayne K Handy
(74) *Attorney, Agent, or Firm* — Hodgson Russ LLP

(57) ABSTRACT

In a manipulation container (1) for cryomicroscopy, having at least one holder (9) for a sample carrier mount (7) and at least one manipulation opening (2) for manipulating sample carriers or sample carrier mounts (7), the holder (9) for a sample carrier mount (7) is movable into a displacement path (11), passing completely through the manipulation container (1), of a displacement apparatus (3) for the sample carrier mount (7).

9 Claims, 5 Drawing Sheets

1

MANIPULATION HOLDER FOR CRYOMICROSCOPY

CROSS-REFERENCE TO RELATED APPLICATIONS

This application claims priority of German patent application number 10 2014 110 724.1 filed Jul. 29, 2014, the entire disclosure of which is incorporated by reference herein.

FIELD OF THE INVENTION

The invention relates to a manipulation container for cryomicroscopy, having at least one holder for a sample carrier mount and at least one manipulation opening for manipulating sample carriers or sample carrier mounts.

BACKGROUND OF THE INVENTION

Cryofixation is a sample preparation method frequently used in electron microscopy. In it, a water-containing sample is frozen very quickly (cryofixed) to a temperature of less than −150° C., i.e. it is cooled very rapidly in order to avoid the formation of ice crystals. Cryofixation has proven to be particularly suitable for investigations of structural biology. The objects to be investigated, for example cells, enzymes, viruses, or lipid layers, thereby become embedded in a thin, vitrified ice layer. The great advantage of cryofixation is that the biological structures can be obtained in their natural state. For example, a biological process can be halted at any point in time by cryofixation, and investigated in that vitrified state, for example in a cryo-electron microscope but also in a light microscope with corresponding sample cooling; cryo-light microscopy serves principally to locate relevant regions in the sample, which can be noted and then viewed in more detail in a cryo-electron microscope.

The frozen samples, which as a general rule are located on electron-microscope sample carriers known per se, for example a grid or a pin stub mount for scanning electron microscopy, must be conveyed (under the aforesaid cryogenic conditions and with water excluded) into corresponding sample carrier mounts that can subsequently be conveyed, in appropriate holders, into the aforesaid microscopes. A typical sample carrier mount for use in connection with the present invention has been disclosed, for example, by the document U.S. Pat. No. 8,395,130 B2, in which a grid that constitutes a sample carrier and carries the frozen sample can be immobilized with clip elements in a corresponding mount.

What have hitherto been used for this are fairly improvised solutions in which liquid nitrogen is stored, for example, in a Styrofoam container in which the requisite manipulation steps for conveying the grid into the sample carrier mounts were performed. The formation of cryogenic nitrogen gas from the liquid nitrogen on the one hand ensures the necessary low temperature and on the other hand creates an anhydrous atmosphere in the Styrofoam container, so that contamination of the samples with water, and consequently with ice crystals, could be prevented.

In order not to impair the quality of the frozen samples, it is very important that they be transferred in cooled and contamination-free fashion between the processing units being used, for example the cryofixation device, freeze fracture apparatus, and coating apparatus, and the analytical devices, in this case principally a cryo-light microscope and cryo-electron microscope. For this as well, in everyday laboratory practice it has hitherto been usual to resort to fairly improvised solutions or to specifically fabricate loading and transfer systems in-house.

A vacuum cryotransfer system is represented, for example, by the "Leica EM VCT100" system of the manufacturer styled Leica Microsystems, with which a sample carrier mount can be removed from a manipulation container cooled with liquid nitrogen and conveyed into the observation chamber, likewise cooled with liquid nitrogen, of an electron microscope. This system is relatively complex, however, since it is a vacuum system that offers only a limited manipulation clearance and entails relatively complex handling of the corresponding samples in the manipulation container. What is necessary for cryo-light microscopy, however, is relatively simple handling of the manipulation container, in which all that is desirable is simple cooling and replacement of water with liquid nitrogen that is introduced into the manipulation container, principally in order enable flexible incorporation of a manipulation container of this kind into various analytical systems and, in particular, microscopy systems.

SUMMARY OF THE INVENTION

The object on which the invention is based is therefore that of refining a manipulation container of the kind recited previously in such a way that standardized and convenient manipulation of sample carriers and sample carrier mounts, and in particular the conveyance of sample carriers in sample carrier mounts as described above, is possible under cold and anhydrous conditions, and displacement of the sample carrier mounts having the sample carriers out of the same manipulation container into, for example, a cryo-light microscope can be accomplished without involving the relatively high physical complexity of a vacuum cryotransfer system.

In order to achieve this object, a manipulation container of the kind recited previously is characterized according to the present invention in that the holder for a sample carrier mount is movable into a displacement path, passing completely through the manipulation container, of a displacement apparatus for the sample carrier mount. The present invention thus makes available a manipulation container that is suitable for the purposes of cryo-light microscopy for partial filling with liquid nitrogen and in which a holder for a sample carrier mount, for example as known from U.S. Pat. No. 8,395,130 B2, is arranged in the manipulation container. According to the present invention the manipulation container furthermore encompasses a displacement apparatus having a displacement path that passes completely through the manipulation container, so that the displacement apparatus mounted on the manipulation container can be slid into the interior of the container where it can receive the sample carrier mount, which is movable by means of the holder into the displacement path of the displacement apparatus, and guide it out of the manipulation container again, so that a sample carrier mount can be conveyed in one working step out of the manipulation container into a sample stage of a cryo-light microscope when the manipulation container is, by means of the displacement apparatus, suitably mounted on or connected to a cryo-light microscope or its sample stage.

The functionality such that the holder is movable into the displacement path of a displacement apparatus can be implemented in any manner. According to a preferred embodiment of the present invention, however, provision is made that the holder for a sample carrier mount is displaceable along a track crossing the displacement path of the displacement apparatus. If, as in the case of this preferred embodiment of the present invention, the holder for a sample carrier mount is displaceable along a track, the holder is always fixedly guided; this allows the user to move the holder, without particular manual skill and especially with the use of simple tools such as metal pins and the like, out of a manipulation position in the container into the displacement path of the displacement apparatus. The track can have any conceivable profile, although it is self-evident to one skilled in the art that the profile of the track has a shape corresponding to the shape of the holder for a sample carrier mount, in order to guide the holder securely and ensure good displaceability of the holder in the track.

In order to further simplify the handling of the samples or sample carriers and sample carrier mounts in the manipulation container according to the present invention, provision is made according to a preferred embodiment of the present invention that along the track at least one rest position for the holder for a sample carrier mount in the displacement path of the displacement apparatus is defined; and at least one further rest position for the holder for a sample carrier mount is defined, in which position the holder abuts in planar fashion against a support for a sample carrier mount so that a sample carrier mount can be displaced from the support onto the holder for a sample carrier mount. According to this preferred variant, at least two preferred rest positions for the holder are therefore furnished, in which positions in the one case the holder occupies a defined site in which the holder is positioned in the displacement path of the displacement direction [sic] in order to grasp the sample carrier mount after manipulation and subsequently displace it, and in the other case the holder abuts in planar fashion against a support for a sample carrier mount, i.e. the holder abuts seamlessly against the support in order to permit simple displacement of the sample carrier mount from the support on which the sample carrier or sample carrier mount are manipulated onto the holder for the sample carrier mount.

The aforesaid rest positions for the holder for the sample carrier mount can be defined by stops, detent elements, or the like. According to a preferred embodiment of the present invention, however, provision is made that the rest positions are defined by the action of magnetic force. In this preferred case, corresponding magnet elements are integrated into the holder and into parts of the manipulation container according to the present invention that are arranged under the holder, for example integrated into the track, so that at the desired rest positions a magnetic attraction force is produced between the magnet elements and the holder for a sample carrier mount, while between these rest positions no magnetic effect or a magnetic repulsion is created, so that the holder for a sample carrier mount preferentially occupies the rest position and, in the case in which an opposite magnetic effect is produced between the desired rest positions, only the rest positions can be continuously occupied.

The holder for a sample carrier mount which is utilized in the context of the manipulation container according to the present invention serves to retain the sample carrier mount for insertion of the sample carrier, and after insertion of the sample carrier to move the sample carrier mount, together with the sample carrier, into the displacement path of the displacement apparatus and retain it there. For this purpose, provision is preferably made that the holder for a sample carrier mount comprises at least two mutually independent clip elements for frictionally engaged holding of the sample carrier mount. Thanks to the provision of clip elements, a sample carrier mount can easily be slid onto the holder beneath the clip elements, and no further elements need to be actuated in order to sufficiently secure the sample carrier mount on the holder.

In order to facilitate sliding of a sample carrier into a sample carrier mount, for example as in the document U.S. Pat. No. 8,395,130 B2, the invention is preferably refined in that the holder for a sample carrier mount comprises a spring-loaded plunger, projecting at least into the working plane of the clip elements, for actuation of the sample carrier mount. Upon insertion of the sample carrier mount into the holder, or upon sliding of the sample carrier mount into the holder, a spring-loaded plunger of this kind can be held in a retracted position and then released so that the plunger presses, against the clamping action of the clip elements, against corresponding regions of the sample carrier mount in order to press corresponding clip elements on the sample carrier mount into a position in which a sample carrier can be inserted.

The displacement apparatus preferably encompasses a hollow shaft, guided into the interior of the manipulation container through a first tube placed externally on the manipulation container, in which shaft a pushrod for actuation of a gripper for the sample is guided, with the result that the sample carrier mount can be removed from the holder for a sample carrier mount when the holder is resting in the displacement path of the displacement apparatus, whereupon the displacement apparatus is retracted and the sample carrier mount can be pulled out of the holder. The holder for a sample carrier mount can then be moved out of the displacement path of the displacement apparatus, and the displacement apparatus can be displaced out by the manipulation container and preferably into a sample stage of a cryo-light microscope.

In order to allow optimum use of the manipulation container and in particular of its functionality furnished by the displacement apparatus, the invention is preferably refined in that the displacement apparatus is guidable out of the manipulation container through a second tube located oppositely to the first tube and placed externally on the manipulation container. Because a second tube, through which the displacement apparatus can be guided, is placed on the manipulation container oppositely to the first tube, a sample can be guided out of the manipulation container with the displacement apparatus in the aforesaid cold and dry nitrogen atmosphere and can be brought or transferred to a downstream device, generally a cryo-light microscope, with no need to bring the container into contact with the, in some cases, relatively bulky parts of said devices, and without colliding with said parts.

It is particularly preferred in this context if the second tube comprises attachment means for attaching the tube to a microscope stage. A sufficiently sealed closure between the manipulation container and a microscope stage can be produced in this manner, so that penetration of moist air to the sample in the context of manipulation and transfer of the sample carriers or the sample carrier mounts can be effectively prevented.

In order to prevent penetration of moist air to the sample in the manipulation container even when the manipulation container is not attached to a microscope stage with the second tube, however, the invention is preferably refined in that the second tube is closable by means of a closure device. A closure device of this kind can be a cover, a slider, or a rotatable bolt passing through the second tube and having an orifice.

According to a preferred embodiment, in order to further ensure an anhydrous atmosphere in the manipulation container, the manipulation container is covered by a transparent cover that is held by spacing pins on the manipulation container. A cover spaced away from the manipulation container in this manner limits the quantity of liquid nitrogen, or of cold nitrogen gas formed therefrom, that is needed in order to effectively drive moisture from the environment out of the interior of the manipulation container, while at the same time at least slight manipulation capabilities are provided by the gap between the cover and the manipulation container. The cover can of course be entirely removed for more complex manipulations.

BRIEF DESCRIPTION OF THE DRAWING VIEWS

The invention will be explained in further detail below with reference to an exemplifying embodiment schematically depicted in the drawings, in which.

Figure 2:
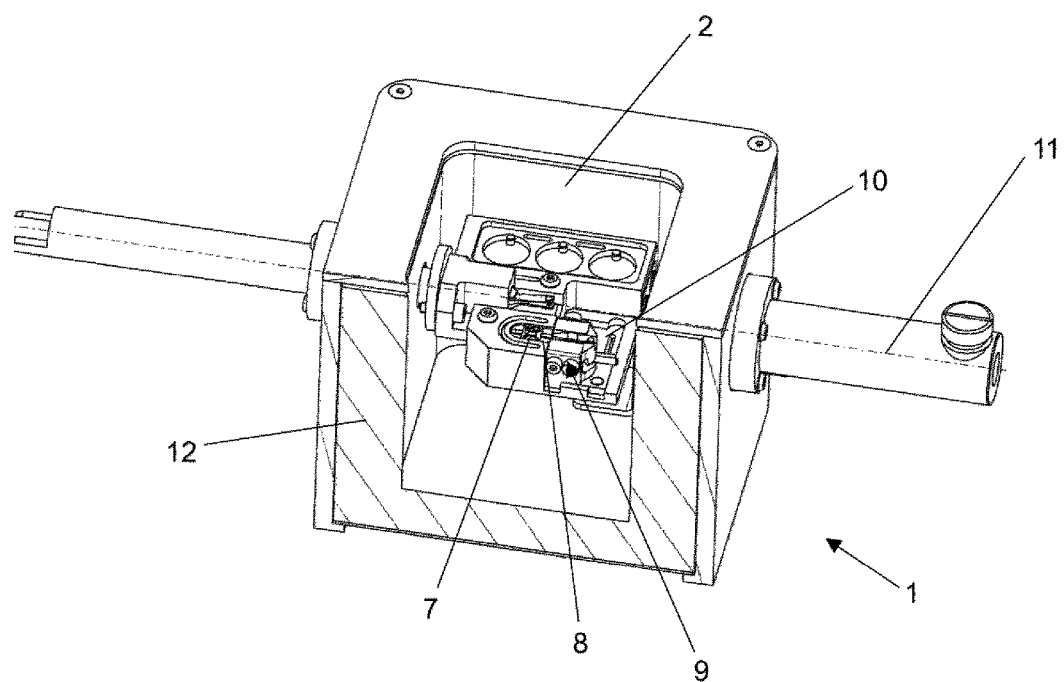
FIG. 2 is a perspective, partly sectioned detail view of the manipulation container according to the present invention.
Figure 4:
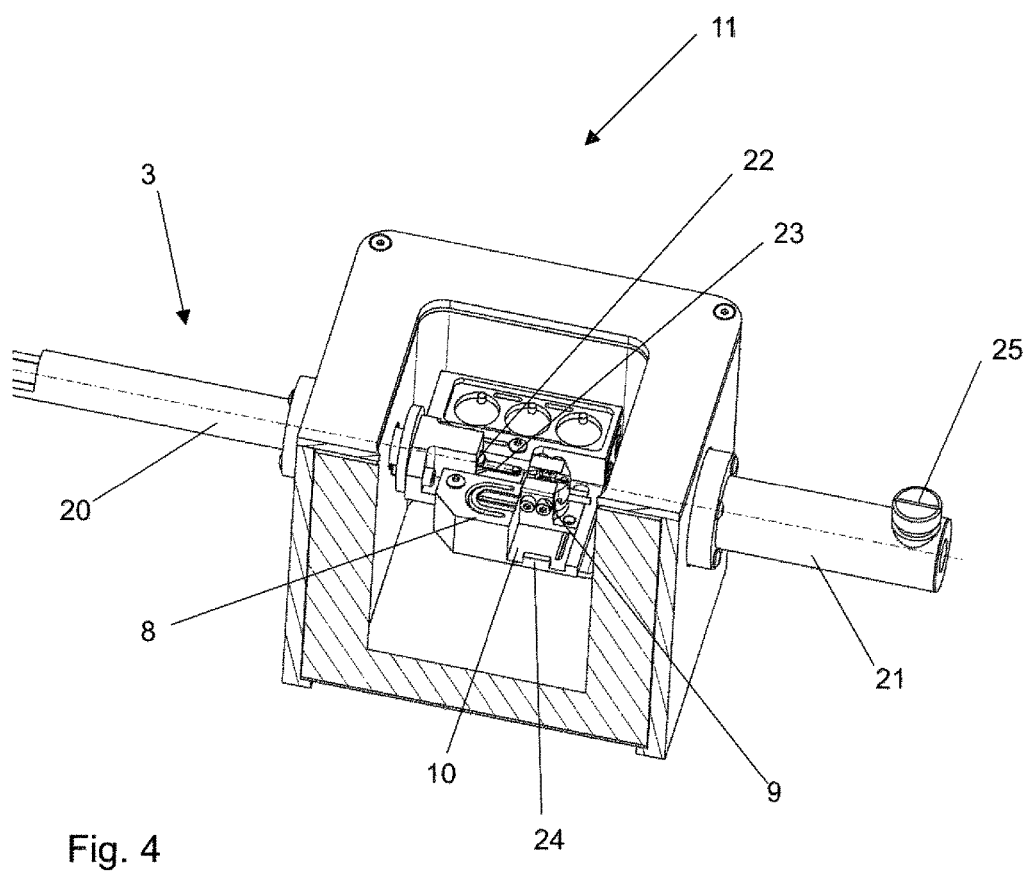
Figure 5:
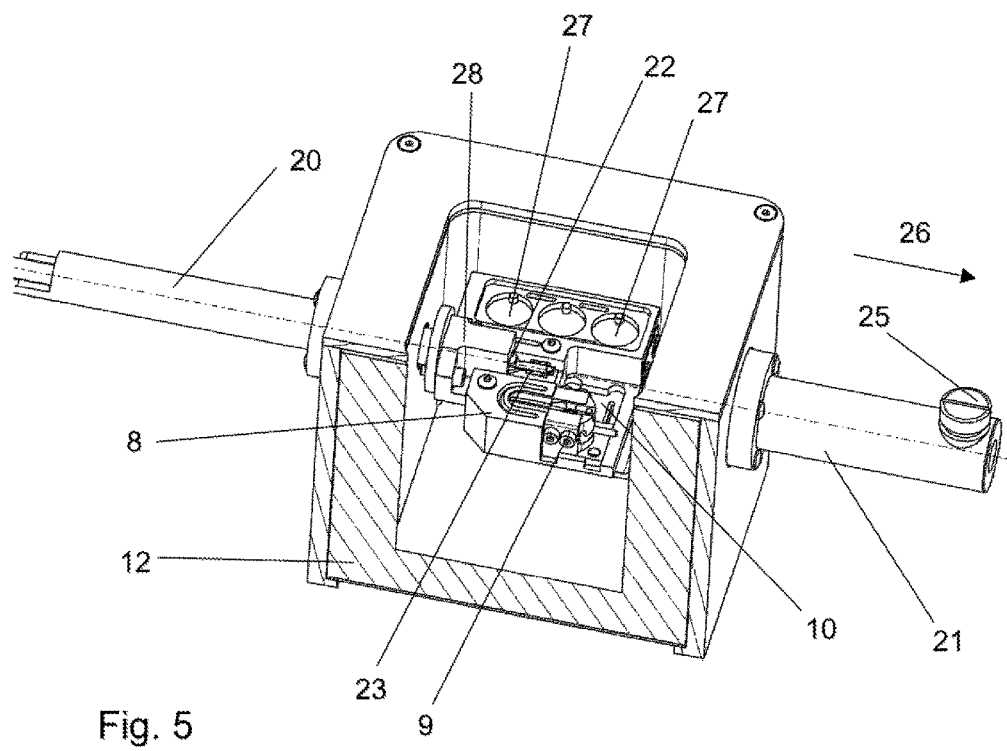

FIG. 4 is a view corresponding to that of FIG. 2, in which the holder for a sample carrier mount is introduced into the displacement path of the displacement apparatus; and FIG. 5 is a further depiction corresponding to FIG. 2, in which a sample carrier mount has been removed with the aid of a gripper from the holder for a sample carrier mount, and the holder for the sample carrier mount has been moved out of the displacement path of the displacement apparatus.

DETAILED DESCRIPTION OF THE INVENTION

Figure 1:
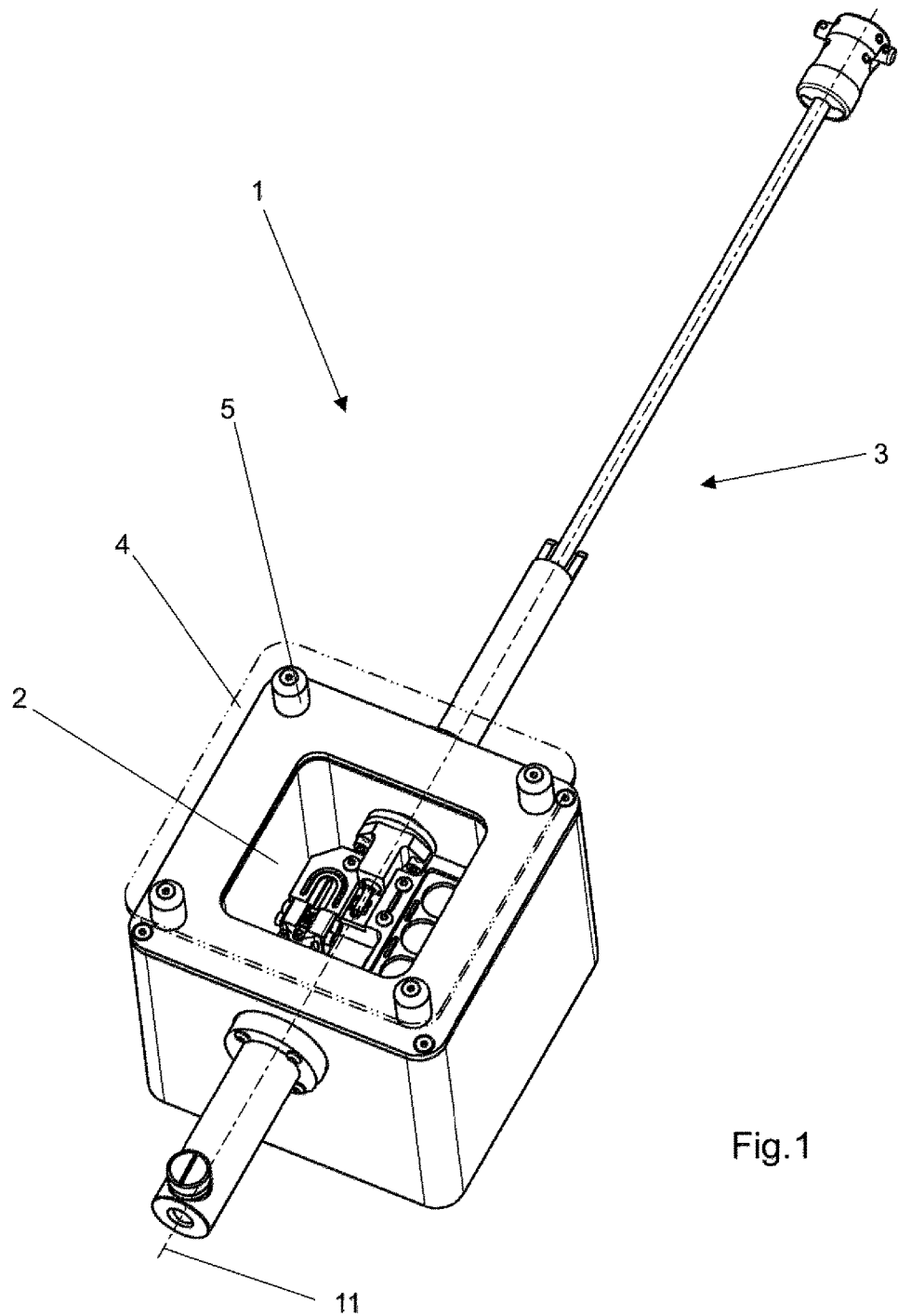
FIG. 1 is an overall perspective view of the manipulation container according to the present invention.

In FIG. 1, a manipulation container according to the present invention is labeled 1. The manipulation container comprises a manipulation opening 2 for the manipulation of sample carriers or sample carrier mounts, and furthermore possesses a displacement apparatus 3 whose displacement path 11 passes completely through manipulation container 1. The number 4 designates a transparent cover that is held on the manipulation container with the aid of spacing pins 5.

It is apparent from the larger depiction in FIG. 2 that manipulation container 1, for which cover 4 is not depicted in this view, possesses in its manipulation opening 2 or in the corresponding manipulation space 6 a number of internal fittings that enable or simplify the manipulation of samples or of sample carrier mounts. It is evident that a sample carrier mount 7 can be placed on a corresponding support 8 against which a holder 9 for a sample carrier mount 7 abuts in planar fashion, so that a sample carrier mount 7 can be displaced from support 8 onto holder 9 for a sample carrier mount 7. Holder 9 is displaceable along a track 10 that crosses displacement path 11 of displacement apparatus 3. Manipulation container 1 is embodied, by way of a corresponding insulator 12, for the reception of liquid nitrogen.

Figures 3A, 3B:
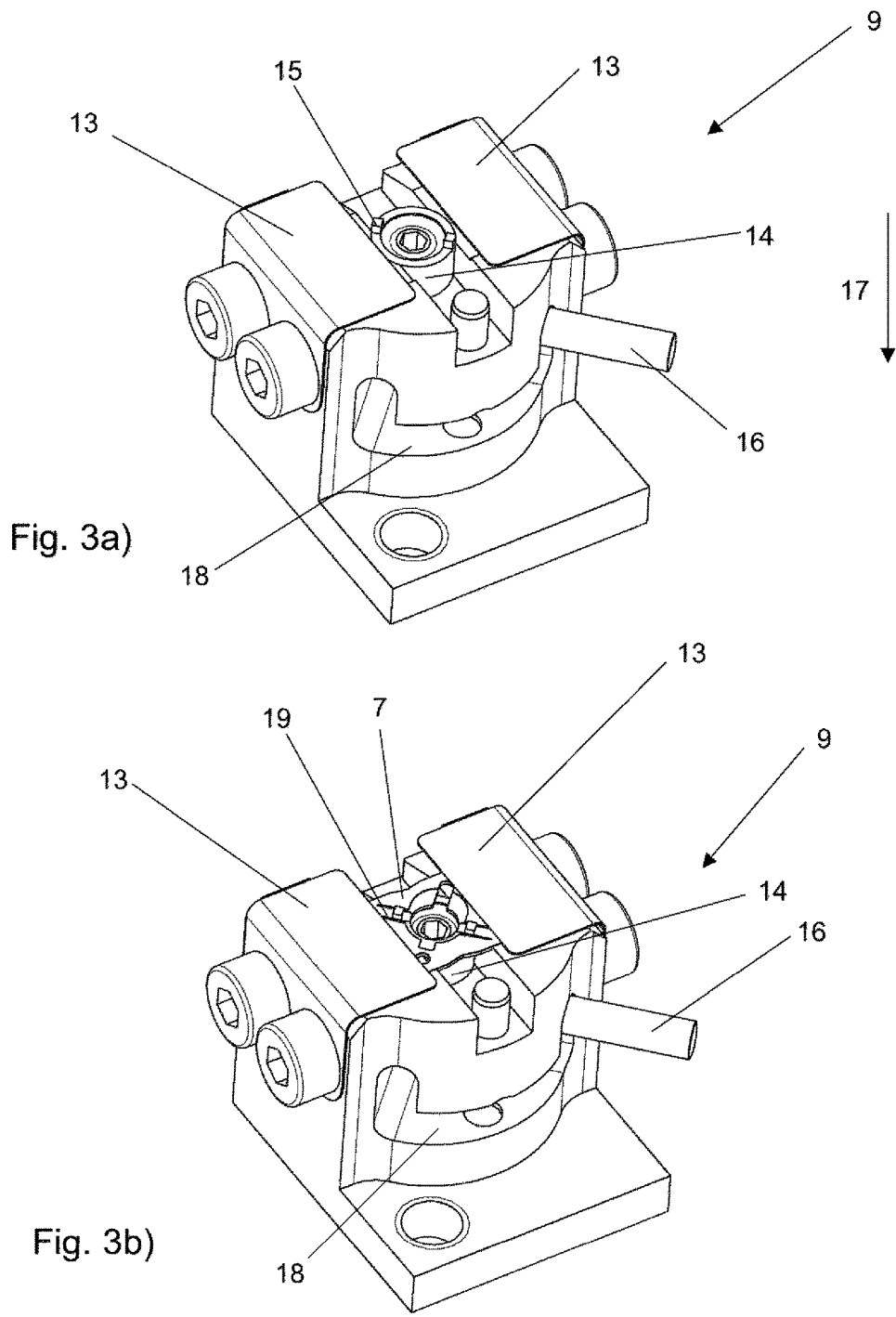
FIGS. 3a and 3b are perspective detail views of the holder for a sample carrier mount, without and with an inserted sample carrier mount.

It is evident from FIG. 3a that holder 9 for a sample carrier mount possesses two mutually independent clip elements 13 with which a sample carrier mount 7 can be retained in frictionally engaged fashion. Holder 9 furthermore comprises a spring-loaded plunger 14 that projects into the working plane of the clip elements, and specially embodied actuation elements 15 for actuating a sample carrier mount. With the aid of lever 16, the spring-loaded plunger 14 can be pushed, against the action of the spring (not depicted), in the direction of arrow 17 and secured in guide 18 in that retracted position. With plunger 14 in the retracted position, a sample carrier mount 7 can then be displaced onto holder 9, in which context clip elements 13 retain sample carrier mount 7 on holder 9, as shown in FIG. 3b. The spring-loaded plunger 14 is likewise depicted in the extended position in FIG. 3b, and it is apparent that actuation elements 15 bend up corresponding clip elements 19 on sample carrier mount 7 so that a grid can be slid into the sample carrier mount.

It is evident from FIG. 4 that displacement apparatus 3 comprises a first tube 20 that is placed externally on manipulation container 1, and that a second tube 21 is provided which is placed oppositely to first 20 and likewise externally on manipulation container 1. Displacement apparatus 3 furthermore encompasses a hollow shaft, which is also evident in FIG. 1 and is labeled with the reference character 22, and which is guided through first tube 20 and can also be further guided through second tube 21; a push rod that serves for actuation of a gripper 23 for the sample or sample carrier mount 7 is guided in hollow shaft 22, of which only the end piece is evident in FIG. 4. In contrast to FIG. 2, it is evident from FIG. 4 that holder 9 has been moved along track 10 into the displacement path of displacement apparatus 11 so that sample carrier mount 7 can be removed, with gripper 23, from holder 9 and from its clip elements 13. A stop 24 defines a rest position in which holder 9 abuts in planar fashion against support 8 for sample carrier mount 7, as is also evident from FIG. 2. The number 25 designates a closure device with which second tube 21 can be closed off in order to prevent excess discharge of nitrogen, or penetration of moist air into the interior of manipulation container 1, when manipulation container 1 is not attached, for example, to a cryo-light microscope.

FIG. 5 depicts a state in which gripper 23 has grasped a sample carrier mount 7 and holder 9 has been moved out of displacement path 11 of displacement device 3, so that in a subsequent step, gripper 23 can be slid out of manipulation container 1 by means of hollow shaft 22 through second tube 21 in the direction of arrow 26, so that sample carrier mount 7 can be deposited, for example, in a sample stage of a light microscope, as long as manipulation container 1 is attached with tube 21 to a sample stage by means of connector means (not depicted in further detail). The number 27 designates support hollows in manipulation container 1 for sample carriers or sample carrier mounts. It is furthermore apparent that support 8, track 10, and support hollows 27 constitute a structural unit that is connected, by way of an intermediate part 28, to displacement apparatus 3 of manipulation container 1 according to the present invention.

PARTS LIST

1 Manipulation container
2 Manipulation opening
3 Displacement apparatus
4 Cover
5 Spacing pins
6 Manipulation space
7 Sample carrier mount
8 Support
9 Holder
10 Track
11 Displacement path 12 Insulator
13 Clip elements
14 Plunger
15 Actuation elements
16 Lever
17 Arrow
18 Guide
19 Clip elements
20 First tube
21 Second tube
22 Hollow shaft
23 Gripper
24 Stop
25 Closure device
26 Arrow
27 Support hollows
28 Intermediate part

What is claimed is:

1. A manipulation container apparatus for cryomicroscopy, the manipulation container apparatus comprising:
   a manipulation container (1);
   a holder (9) for holding a sample carrier mount (7);
   at least one manipulation opening (2) for permitting manipulation of a sample carrier mount (7) received in the manipulation container (1); and
   a displacement apparatus (3) for displacing a sample carrier mount (7) received in the manipulation container (1), the displacement apparatus (3) having a displacement path (11) passing completely through the manipulation container (1);
   wherein the holder (9) is movable into the displacement path (11); and
   wherein the manipulation container (1) comprises a track (10) crossing the displacement path (11) of the displacement apparatus (3), and the holder (9) is displaceable along the track (10);
   the manipulation container apparatus further comprising a support (8) configured to support a sample carrier mount (7), wherein a first rest position for the holder (9) is defined along the track (10) such that the holder (9) is located in the displacement path (11) when the holder (9) is at the first rest position, and wherein a second rest position for the holder (9) is defined along the track (10) such that the holder (9) abuts in planar fashion against the support (8) so that a sample carrier mount (7) can be displaced from the support (8) onto the holder (9) when the holder (9) is at the second rest position.

2. The manipulation container apparatus according to claim 1, wherein the first and second rest positions are defined by the action of magnetic force provided by magnet elements integrated into the holder (9) and into the manipulation container (1).

3. The manipulation container apparatus according to claim 1, wherein the holder (9) comprises at least two mutually independent clip elements (13) for holding a sample carrier mount (7) by frictional engagement.

4. A manipulation container apparatus for cryomicroscopy, the manipulation container apparatus comprising:
   a manipulation container (1);
   a holder (9) for holding a sample carrier mount (7);
   at least one manipulation opening (2) for permitting manipulation of a sample carrier mount (7) received in the manipulation container (1); and
   a displacement apparatus (3) for displacing a sample carrier mount (7) received in the manipulation container (1), the displacement apparatus (3) having a displacement path (11) passing completely through the manipulation container (1);
   wherein the holder (9) is movable into the displacement path (11);
   wherein the holder (9) comprises at least two mutually independent clip elements (13) for holding a sample carrier mount (7) by frictional engagement; and
   wherein the holder (9) comprises a spring-loaded plunger (14) projecting at least into a working plane of the clip elements (13) for actuation of a sample carrier mount (7).

5. The manipulation container apparatus according to claim 1, wherein the displacement apparatus (3) includes a hollow shaft (22), a first tube (20) placed externally on the manipulation container (1) to guide the hollow shaft (22) into an interior of the manipulation container (1), and a gripper (23) actuated by a pushrod guided by the hollow shaft (22).

6. The manipulation container apparatus according to claim 5, further comprising a second tube (21) located oppositely to the first tube (20) and placed externally on the manipulation container (1), wherein the gripper (23) is guidable out of the manipulation container (1) through the second tube (21).

7. A manipulation container apparatus for cryomicroscopy, the manipulation container apparatus comprising:
   a manipulation container (1);
   a holder (9) for holding a sample carrier mount (7);
   at least one manipulation opening (2) for permitting manipulation of a sample carrier mount (7) received in the manipulation container (1); and
   a displacement apparatus (3) for displacing a sample carrier mount (7) received in the manipulation container (1), the displacement apparatus (3) having a displacement path (11) passing completely through the manipulation container (1);
   wherein the holder (9) is movable into the displacement path (11); and
   wherein the displacement apparatus (3) includes a hollow shaft (22), a first tube (20) placed externally on the manipulation container (1) to guide the hollow shaft (22) into an interior of the manipulation container (1), and a gripper (23) actuated by a pushrod guided by the hollow shaft (22);
   the manipulation container apparatus further comprising a second tube (21) located oppositely to the first tube (20) and placed externally on the manipulation container (1), wherein the gripper (23) is guidable out of the manipulation container (1) through the second tube (21);
   wherein the second tube (21) includes attachment means for attaching the second tube (21) to a microscope stage.

8. The manipulation container apparatus according to claim 6, wherein the second tube (21) includes a closure device (25) operable to selectively close the second tube (21).

9. The manipulation container apparatus according to claim 1, further comprising a transparent cover (4) held on the manipulation container (1) by spacing pins (5).

* * * * *